US009522389B2

(12) United States Patent
Sambandan et al.

(10) Patent No.: US 9,522,389 B2
(45) Date of Patent: Dec. 20, 2016

(54) HIGH SURFACE AREA PHOTOCATALYST MATERIAL AND METHOD OF MANUFACTURE

(71) Applicant: Nitto Denko Corporation, Osaka (JP)

(72) Inventors: Ekambaram Sambandan, Carlsbad, CA (US); Rajesh Mukherjee, Irvine, CA (US); Takuya Fukumura, Carlsbad, CA (US); Amane Mochizuki, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 826 days.

(21) Appl. No.: 13/790,952

(22) Filed: Mar. 8, 2013

(65) Prior Publication Data

US 2013/0237409 A1    Sep. 12, 2013

Related U.S. Application Data

(60) Provisional application No. 61/608,754, filed on Mar. 9, 2012.

(51) Int. Cl.
*B01J 27/24* (2006.01)
*B01J 37/08* (2006.01)
(Continued)

(52) U.S. Cl.
CPC ............... *B01J 27/24* (2013.01); *B01J 23/50* (2013.01); *B01J 27/22* (2013.01); *B01J 35/004* (2013.01);
(Continued)

(58) Field of Classification Search
CPC ....................................................... B01J 27/24
See application file for complete search history.

(56) References Cited

U.S. PATENT DOCUMENTS

2004/0105810 A1   6/2004  Ren et al.
2005/0227854 A1*  10/2005 Orth-Gerber ......... C09C 1/3669
                                                   502/100
(Continued)

FOREIGN PATENT DOCUMENTS

CN       101948135 A    1/2011
WO       2005108505 A1  11/2005
(Continued)

OTHER PUBLICATIONS

Muramatsu et al, Fabrication of Densely Packed Titania Nanosheet Films on Solid Surface by Use of Langmuir-Blodgett Deposition Method without Amphiphilic Additives, 2005, Langmuir, 21, pp. 6590-6595.*

(Continued)

*Primary Examiner* — Melvin C Mayes
*Assistant Examiner* — Stefanie Cohen
(74) *Attorney, Agent, or Firm* — K&L Gates LLP; Brent A. Johnson; Louis C. Cullman

(57) ABSTRACT

Photocatalytic materials are described herein which include thin nanostructures. For example, the catalytic material can include a nanostructure that has a thin structure of a photocatalytic composition, wherein the thin structure is defined by a first surface and a second surface on opposite sides of the thin structure of the photocatalytic composition. The photocatalytic composition may include an inorganic compound, such as a titanium and/or stannous oxide. The first surface and a second surface may be relatively large as compared to the thickness of the thin structure, or the thickness of the nanostructure.

15 Claims, 9 Drawing Sheets

(51) Int. Cl.
  *B01J 23/50* (2006.01)
  *B01J 27/22* (2006.01)
  *B01J 35/00* (2006.01)
  *B01J 35/02* (2006.01)
  *B01J 35/10* (2006.01)

(52) U.S. Cl.
  CPC ........... *B01J 35/023* (2013.01); *B01J 35/1014* (2013.01); *B01J 35/1019* (2013.01); *B01J 37/08* (2013.01)

(56) References Cited

U.S. PATENT DOCUMENTS

| | | |
|---|---|---|
| 2007/0202362 A1 | 8/2007 | Neto et al. |
| 2008/0156228 A1 | 7/2008 | Yadav |
| 2008/0276987 A1 | 11/2008 | Flood |
| 2008/0292872 A1 | 11/2008 | Boire et al. |
| 2010/0062928 A1* | 3/2010 | Jin .................. C09C 1/3676 502/159 |
| 2011/0129204 A1 | 6/2011 | Lee et al. |
| 2013/0237409 A1 | 9/2013 | Sambandam et al. |
| 2014/0256540 A1 | 9/2014 | Sambandan et al. |

FOREIGN PATENT DOCUMENTS

| | | |
|---|---|---|
| WO | WO 2005/108505 | 11/2005 |
| WO | WO 2009/086193 | 7/2009 |
| WO | 2009086193 A2 | 9/2009 |
| WO | 2012056418 | 3/2012 |
| WO | WO 2012/056418 | 5/2012 |

OTHER PUBLICATIONS

Yang et al, Sandwich-Like, Graphene-Based Titania Nanosheets with High Surface Area for Fast Lithium Storage, 2011, Adv. Mater., pp. 3575-3579.*

International Search Report and Written Opinion mailed on May 23, 2013 for International Application No. PCT/US2013/029964 filed on Mar. 8, 2013.

ISR and Written Opinion for PCT/US2014/054137, mailed Nov. 27, 2014.

Taiwanese Office Action issued Jul. 1, 2016—TW-102108262 and English translation.

* cited by examiner

Combustion
400°C
Anneal
475°C, 1h, air

HIGH SURFACE AREA PHOTOCATALYST MATERIAL AND METHOD OF MANUFACTURE

CROSS REFERENCE TO RELATED APPLICATIONS

This application claims the benefit of U.S. provisional patent application No. 61/608,754, filed Mar. 9, 2012, the entire disclosure of which is incorporated herein by reference.

BACKGROUND

Visible-light activated photocatalysts can be deployed for self-cleaning, air and water purification, and many other applications usually without any post-deployment non-renewable energy costs. This is because the photocatalysts are able to decompose pollutants (like dyes, volatile organic compounds and $NO_x$) using available ambient light-like solar radiation or indoor and outdoor lighting. With the anticipated rapid adoption of UV-free indoor lighting (like LEDs and OLEDs), it is important to find ways to deploy visible-light activated photocatalysts in indoor applications, for instance in cleaning room air in domestic, public and commercial spaces especially in confined spaces like aircrafts, public buildings, etc. Moreover, additional applications for antibacterial surfaces and self-cleaning materials can have wide applicability in the food service, transportation, health care and hospitality sectors.

SUMMARY

Photocatalytic materials are described herein which include thin nanostructures. For example, the catalytic material can comprise a nanostructure that has a thin structure of a photocatalytic composition, wherein the thin structure is defined by a first surface and a second surface on opposite sides of the thin structure of the photocatalytic composition. The photocatalytic composition may comprise an inorganic compound. The first surface and the second surface may be relatively large as compared to the thickness of the thin structure, or the thickness of the nanostructure.

Some embodiments include a photocatalytic material comprising: a nanostructure comprising: a thin structure of a photocatalytic composition comprising an inorganic compound, which is defined by a first surface and a second surface on opposite sides of the thin structure of the photocatalytic composition; and wherein the thin structure of the photocatalytic composition has a thickness that is substantially smaller than the square root of the area of the first surface.

Some embodiments include a method of manufacturing a high surface area photocatalyst, such as a photocatalyst described herein, comprising: heating a liquid dispersion comprising a photocatalyst precursor, a reducing agent, and an oxidizing agent at a temperature sufficient to initiate combustion, wherein heating continues for a time sufficient to form a solid product.

These and other embodiments are described in greater detail herein.

DETAILED DESCRIPTION

Figure 1:
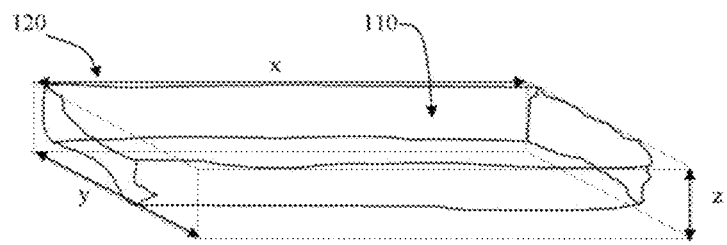
FIG. 1 is a diagram to provide assistance in determining an x dimension, a y dimension, and a z dimension of a nanostructure.

There is a continuing need to enhance the activity level of photocatalysts. A high surface area photocatalyst can potentially have improved photocatalytic activity, even for high activity materials. Thus, a high surface area photocatalyst which is appropriately doped or loaded has a potential for enhanced activity. There is also a need for a manufacturing method to cheaply and rapidly manufacture these high activity optimally-doped or loaded high surface area photocatalysts.

A photocatalytic material described herein (referred to hereafter as "photocatalytic material") generally includes one or more nanostructures, typically a plurality of nanostructures. A nanostructure includes structures having a dimension in the nanometer to micron range. The nanostructures can be a substantial portion of the photocatalytic composition, for example, the nanostructures can be at least 10%, at least 30%, at least 50%, at least 80%, at least 90%, or substantially all of the mass of the photocatalytic material.

A nanostructure described herein (referred to hereafter as "nanostructure") comprises a photocatalytic composition, and/or is composed of a photocatalytic composition. A nanostructure is typically in the form of a thin structure of the photocatalytic composition. The thin structure of the photocatalytic composition is defined by a first surface and a second surface on opposite sides of the thin structure of the photocatalytic composition. The thin structure of the photocatalytic composition has a thickness that is substantially smaller than the square root of the area of the first surface. Typically, the thickness of the thin structure is the same as the thickness of the nanostructure.

In some embodiments, the first surface has a coplanar area that is substantially same as the coplanar area of the second surface. In some embodiments, the first surface has a coplanar area that is substantially greater than a coplanar area of the second surface. While "coplanar area" is a broad term, one way to determine the coplanar area of a surface may be to place the surface under consideration on a smooth flat surface and measure the area of the surface that contacts the smooth flat surface. In other words, the "coplanar area" of a surface is equivalent to the area of its orthogonal projection.

In some embodiments, the first surface has an area that is substantially the same as the area of the second surface. In some embodiments, the first surface has an area that is substantially greater than the area of the second surface.

The first surface and/or second surface can be flat, but need not be flat. For example, a nanostructure may be planar, or nearly so. A nanostructure may also be curved. For example, a nanostructure can resemble some or part of a hollow sphere or a hollow cylinder, such that the first surface may be the outer surface of part or all of the hollow sphere or cylinder and the second surface may be the inner surface of part or all of the hollow sphere or cylinder. Alternatively, the first surface may be the inner surface and the second surface may be the outer surface. A nanostructure may also be a structure that is a combination of planar and curved shape. The nanostructure may have substantially uniform thickness throughout the thin structure, or may have a thickness that varies within the thin structure.

Typically, the thickness of the nanostructure or the thin structure can be in the nanometer range. In some embodiments, the thickness is about 10 nm to about 200 nm, about 10 nm to about 100 nm, about 10 nm to about 50 nm, about 20 nm to about 30 nm, or about 20 nm to about 25 nm.

In some embodiments, at least 10%, at least 30%, at least 50%, or at least 80% of the nanostructures in the photocatalytic material have a thickness of about 10 nm to about 300 nm, about 10 nm to about 200 nm, about 10 nm to about 100 nm, about 10 nm to about 50 nm, about 20 nm to about 30 nm, or about 20 nm to about 25 nm.

In some embodiments, at least 10%, at least 30%, at least 50%, or at least 80% of the nanostructures in the photocatalytic material have a thickness of about 10 nm to about 300 nm, about 10 nm to about 200 nm, about 10 nm to about 100 nm, about 10 nm to about 50 nm, about 20 nm to about 30 nm, or about 20 nm to about 25 nm.

In some embodiments, the average thickness of the nanostructures in the photocatalytic material is about 10 nm to about 300 nm, about 10 nm to about 200 nm, about 10 nm to about 100 nm, about 10 nm to about 50 nm, about 20 nm to about 30 nm, or about 20 nm to about 25 nm.

A surface of the nanostructures, such as a first surface or a second surface, has an area that is significantly larger than the thickness of the nanostructures. For example, the average of the two dimensions in the surface, or the square root of the surface area, can be significantly larger, such as an order of magnitude or more, than the thickness of the nanostructure. In some embodiments, square root of the area of the first surface is at least 3 times, at least 5 times, at least 10 times, at least 100 times, about 10 times to about 100,000 times, about 10 times to about 1000 times, about 3, about 5, about 10, about 20, about 100, about 1000, about 10,000, or about 100,000 the thickness of the thin structure of the photocatalytic composition, or any value in a range bounded by, or between, any of these ratios.

Although a nanostructure may be irregularly shaped, three dimensions, x, y, and z, may be quantified as depicted in FIG. 1. If a box 120 the shape of a rectangular prism is formed around the nanostructure 110, the x dimension is the longest dimension of the box, the y dimension is the second longest dimension of the box, and the z dimension is the third longest dimension of the box. In other words, the dimensions x, y, and z are equivalent to the orthogonal projections of the longest dimension, second longest dimension and third longest dimension of the material or fragment thereof. These dimensions may be altered by further fragmenting the material by methods including crushing, ball milling, beads milling or impact fracturing. For the artisan knowledgeable in the art, it should be clear that fragmentation does not alter the basic description of the various embodiments of the high surface areas structures including nanoflake-shaped, nanosheet-shaped, ribbon-shaped or pseudoplanar-shaped materials.

Three dimensional shapes of a nanostructure may be characterized by describing the shape of the nanostructure when viewed in a certain plane. For example, the nanostructure may be substantially rectangular, substantially square, substantially elliptical, substantially rhomboid, substantially circular, substantially triangular, substantially parallelogramatic, substantially polygonal, etc., when viewed in the two dimensions of the xy, xz, or yz plane. The particular shape need not be geometrically perfect, but need only be recognizable as reasonably similar to a known shape. The three dimensional shape of the nanostructure might also be characterized or described using other terms.

Figure 2:
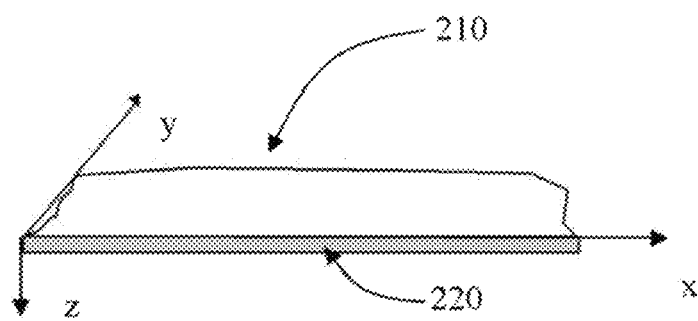
FIG. 2 depicts an idealized example of a shape that may be described as: substantially rectangular when viewed in the xz plane, pseudoplanar-shaped, and/or as a curved or wavy nanoflake-shaped material.

FIG. 2 depicts an idealized example of a nanostructure 210 that is substantially rectangular 220 when viewed in the xz plane. As depicted in this figure, the nanostructure appears perfectly rectangular, but the shape need only be recognizable as similar to a rectangle to be substantially rectangular when viewed in the xz plane or any other plane.

Nanostructure 210 may also be described as nanoflake-shaped. The term "nanoflake" is a broad term that includes nanostructures that are flake-like in shape. This may include nanostructures that are relatively thin in one dimension (e.g., z) and have a relatively large area in another two dimensions (e.g., xy).

The surface of a larger area need only be identifiable, but does not need to be planar. For example, the surface of a larger area may be substantially in the xy plane, such as nanostructure 210, but may also be curved or wavy, such that at least a portion or substantial portions of the surface are not in the plane.

Nanostructure 210 may also be described as pseudoplanar. The term "pseudoplanar" is a broad term that includes nanostructures that are essentially planar. For example, a pseudoplanar nanostructure may have a z dimension that is relatively insignificant as compared to the xy area of the nanostructure that is substantially in the xy plane.

At least a portion of some nanostructures can be wavy. The term "wavy" refers to a morphology with regions of substantially positive and negative radii of curvature. The magnitude of the positive and negative radii of curvature of the different regions of the wavy nanostructure may or may not be equal to each other.

In some embodiments, the magnitude of the radii of curvatures are between about 1 nm and about 10 μm, between about 1 nm and about 1 μm, between about 1 nm and about 100 nm, and/or between about 1 nm and about 50 nm.

Figure 3:
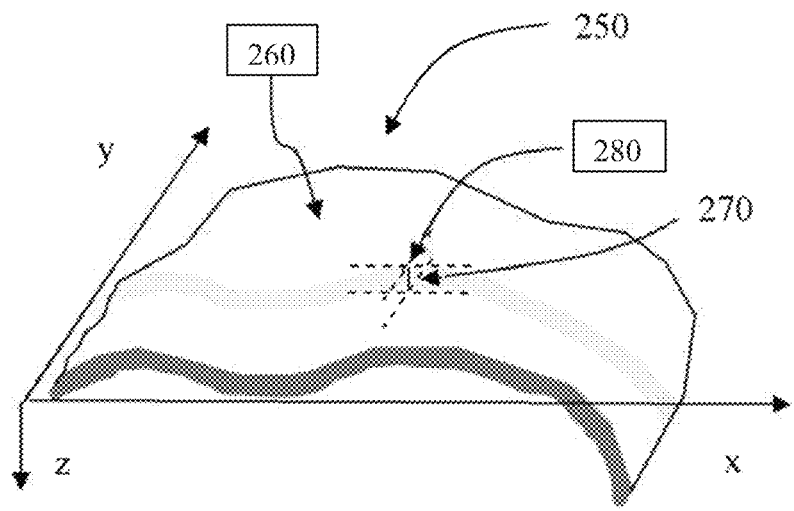
FIG. 3 depicts an idealized example of a shape that may be described as: substantially pseudoplanar-shaped, and/or as a curved or wavy nanoflake-shaped material.

In FIG. 3, nanostructure 250 is an example of a curved or wavy nanoflake-shaped nanostructure. If substantial portions of the surface are not in the plane, a nanoflake-shaped nanostructure may include nanostructure having a large curved or wavy surface 260 and a small thickness 270 normal to a given point 280 on the surface.

Figure 4:
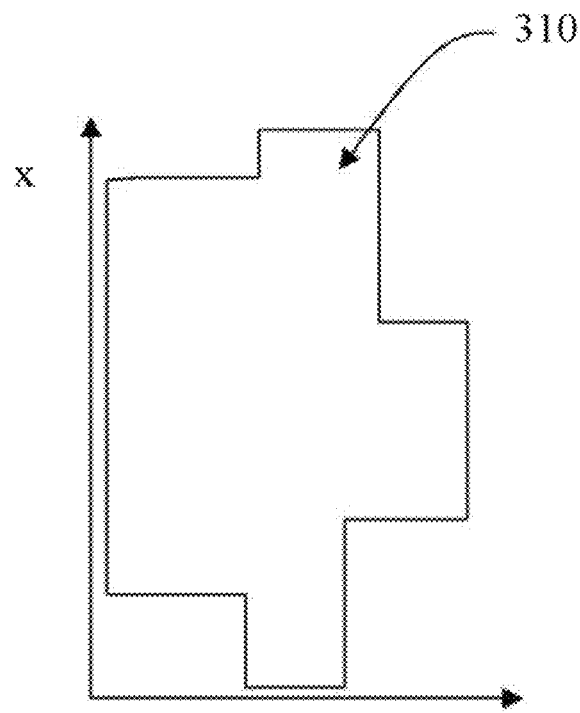
FIG. 4 depicts an idealized example of a shape having substantially all right angles in the plane.

FIG. 4 depicts an idealized example of a nanostructure 310 having substantially all substantially right angles in the xy plane. While not depicted in this figure, some nanostructures may not have substantially all substantially right angles, but may have at least one substantially right angle. The nanostructure 310 of this figure may also be described as pseudo-parallelogramatic or polygonal. The polygon may be convex or concave. All internal angles of a convex polygon are less than 180°. A polygon that has one or more interior angles greater than 180° is defined as a concave polygon. A pseudo-parallelogramatic nanostructure may include two substantially linear portions of outer edges of the nanostructure that are substantially parallel viewed in the two dimensions of the xy, xz, or yz plane. For the purposes of this disclosure, the bounding lines of the pseudo-parallelogram or polygon may not be perfectly straight but only substantially so.

The outer edges of the nanostructure may consist essentially of a plurality of linear edge portions.

Pseudo-parallelogram-shaped nanostructures may have substantially right angles such as those depicted in FIG. 4, or they may have angles that may not be substantially right angles.

Figure 5:
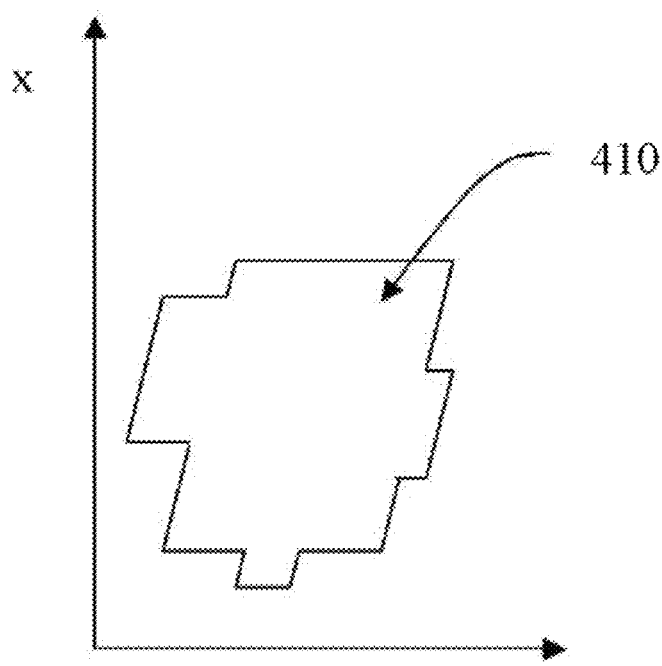
FIG. 5 is an idealized example of a pseudo-paralellogramatic shape having angles that may not be substantially right angles.

FIG. 5 is an idealized example of a pseudo-parallelogram-shaped nanostructure 410 having angles that may not be substantially right angles.

A nanostructure may be described as ribbon-shaped if it has a shape that is reasonably recognizable as similar to the shape of a ribbon. This may include nanostructures that have a flat rectangular surface that is elongated in one dimension and thin in another dimension. The ribbon shape may also be curved, twisted, bunched (longitudinally and/or laterally compressed), or a combination of thereof, so that the nanostructure need not be substantially coplanar to be ribbon-shaped.

A nanostructure may be described as nanosheet-shaped if it has a shape that is reasonably recognizable as similar to the shape of a sheet. This may include nanostructures that have a flat rectangular surface that is elongated in one dimension and thin in another dimension. The nanosheet shape may also be bunched (longitudinally and/or laterally compressed), curved, or twisted, or a combination of thereof, so that the nanostructure need not be substantially coplanar to be nanosheet-shaped.

In some embodiments, at least some portion of the photocatalyst material may include one or more nanostructures in the form of a nanosheet. A nanosheet-shaped nanostructure can be a fragment of material with one dimension substantially smaller than the two largest dimension where the smallest dimension is nanometric, e.g. less than about 1000 nm. In some embodiments, the smallest dimension of the nanosheet-shaped nanostructure may be less than about 10% of the largest dimension. In some embodiments, the smallest dimension of the nanosheet-shaped nanostructure is less than about 1% of the largest dimension. In some embodiments, the smallest dimension of the nanosheet-shaped nanostructure is less than about 0.1% of the largest dimension.

In some embodiments, either or both the bounding surfaces of the nanosheet-shaped nanostructure have at least one concave or convex feature or a combination thereof. In some embodiments, the nanosheet-shaped nanostructure has substantially same radius of curvature at all points on at least the first surface or the second surface. In some embodiments, the larger of the first surface and the second surface (for a nanosheet-shaped nanostructure) has varying radii of curvature. In some embodiments, the first surface and the second surface of the nanosheet-shaped nanostructure have concomitantly varying radii of curvature. In some embodiments, the raised and recessed portions may be defined by two or more of a pitch between raised portion, a pitch between recessed portions, a height of a raised portion, and a depth of a recessed portion.

Figure 6:
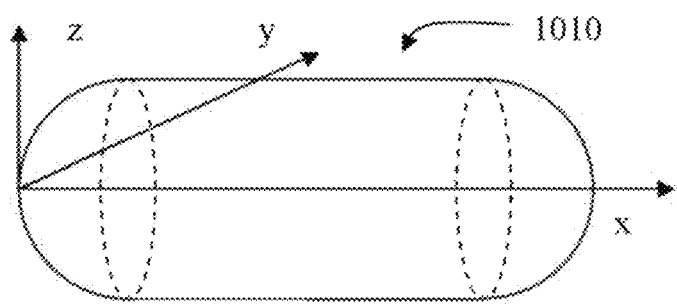
FIG. 6 depicts an idealized example of a substantially capsule-shaped pore.

FIG. 6 depicts an idealized example of a substantially capsule-shaped pore 1010. When viewed in the xy or the xz plane, the pore 1010 may also be described as substantially oval. When viewed in the yz plane, the pore 1010 may also be described as substantially circular.

A pore may be described as cylindrical-shaped if it has a shape that is reasonably recognizable as similar to the shape of a cylinder. This may include pores that are elongated in one dimension. A cylindrically-shaped pore may be substantially straight, or have some curvature or bending.

In some embodiments, the nanostructure is nanosheet-shaped, nanoflake-shaped, pseudoplanar-shaped, or ribbon-shaped.

The shape of the nanostructures can help the photocatalytic material to have a large surface area. For example, a photo catalytic material may have a Brunauer-Emmett-Teller (BET) specific surface area of at least 30 $m^2/g$, at least about 50 $m^2/g$, at least about 70 $m^2/g$, at least about 100 $m^2/g$, at least about 150 $m^2/g$, at least about 200 $m^2/g$, about 70 $m^2/g$ to about 500 $m^2/g$, about 100 $m^2/g$ to about 300 $m^2/g$, about 150 $m^2/g$ to about 250 $m^2/g$, about 170 $m^2/g$ to about 220 $m^2/g$, about 180 $m^2/g$ to about 200 $m^2/g$, about 190 $m^2/g$, or 191 $m^2/g$. A large surface area can help to improve photocatalytic activity.

In some embodiments, the nanostructures are substantially transparent or translucent. In some embodiments, a photocatalytic material is at least 55% transparent, 65% transparent, 75% transparent, 80% transparent, 85% transparent, 90% transparent, and/or at least 95% transparent to incident radiation, e.g., uv and/or visible light.

In some embodiments, the photocatalytic material may be dispersed in a matrix, which may contain materials such as organic binders, inorganic binders or mixtures thereof. Suitable organic binders include silicone, epoxy, PMMA, etc. Suitable inorganic binders include silica, ceria, alumina, aluminosilicates, calcium aluminates, etc.

Figure 8:
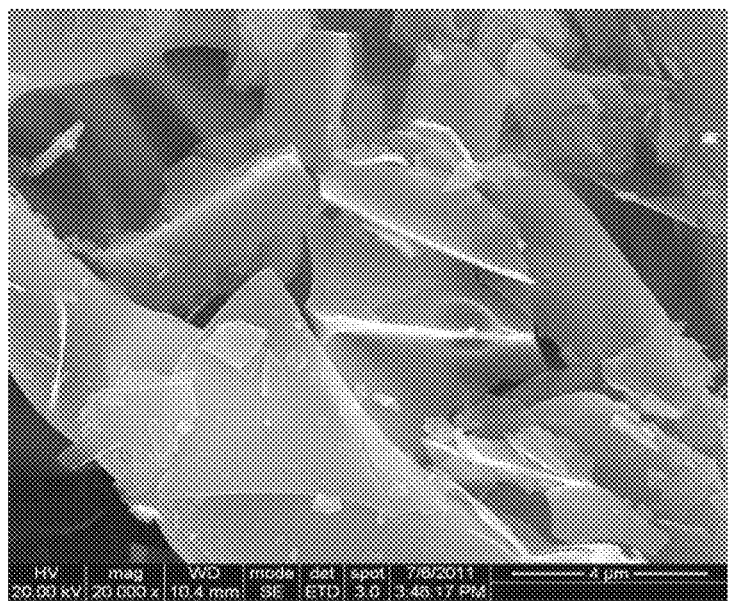
FIG. 8 depicts an SEM image of photocatalyst material (Material A) from Example 11.
Figure 9:
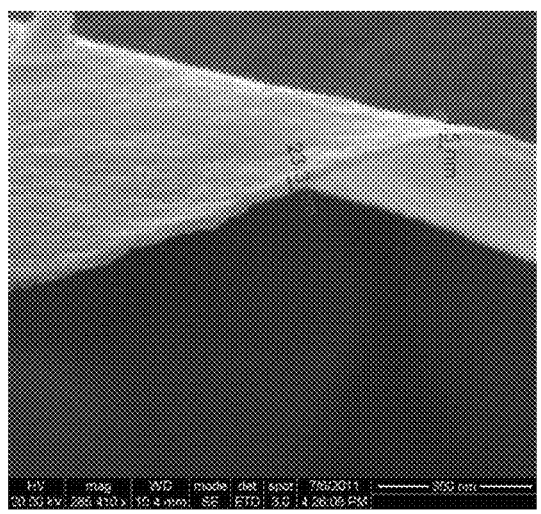
FIG. 9 depicts an HR (High Resolution) SEM image Material A from Example 11.
Figure 10:
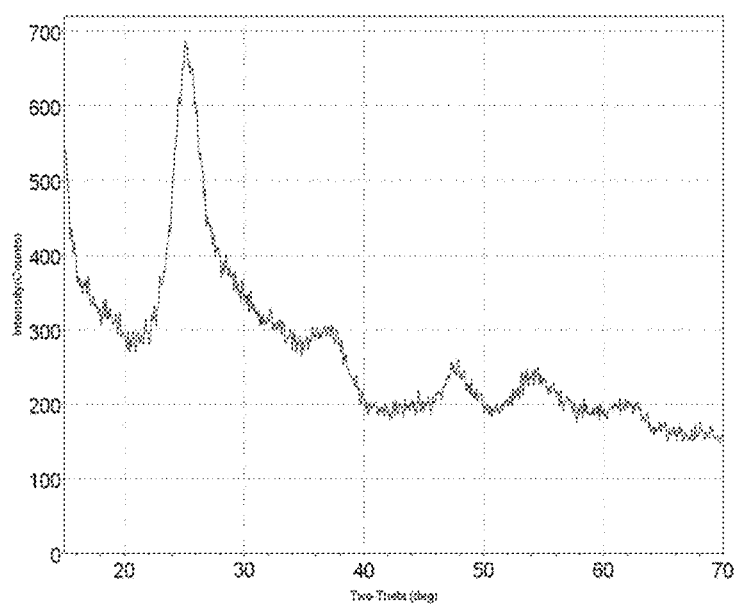
FIG. 10 depicts an x-ray diffraction (XRD) pattern of photocatalyst material of Example 10.

FIGS. 8-9 depict SEM images of actual photocatalytic material. All SEM images were recorded using a FEI Inspect F SEM; 2007 model, version 3.3.2. In these figures, "mag" indicates the magnification level of the image, "mode" indicates the type of detector used to generate the image, where "SE" stands for secondary electron mode, "HV" indicates the accelerating voltage of the electron beam used to generate the image in kV, "WD" indicates the working distance between the detector and the actual surface being imaged in mm, and "spot" indicates a unitless indicator of the electron beam diameter at the time of image capture.

FIGS. 8-9 depict an SEM image of an embodiment of a photocatalytic material. Although not exhaustive, the following descriptions may apply to at least one of the nanostructures in these figures when viewed in the xy plane: pseudo-parallelogramatic, at least one substantially right angle, and substantially all substantially right angles. Although not exhaustive, the following descriptions may apply to at least one of the nanostructures in this figure when viewed in the yz plane: substantially rectangular, substantially linear, and substantially all substantially right angles. Although not exhaustive, the following other descriptions may also apply to at least one of the nanostructures in these figures: nanoflake-shaped, nanosheet-shaped, ribbon-shaped and pseudoplanar-shaped.

A scale bar of 4 μm is indicated in the SEM of FIG. 8, which may provide an indication of the size of the nanostructure. FIG. 9 has a scale bar of 300 nm which provides some indication of the thickness of the nanosheet or nanoflake.

The nanostructure may be completely solid, or there may be gaps, voids, or pores, within, or extending through, the nanostructure. For example, some nanostructures may comprise a pore that extends from the first surface to the second surface through the thin structure of the photocatalytic composition. Alternatively, a nanostructure can be free of pores that extend from the first surface to the second surface through the thin structure of the photocatalytic composition.

In some embodiments, some of the pores have only one opening and are truncated inside the body of the material, i.e., they are blind or closed pores. In some embodiments, the blind end of blind pores appear as bubbles on the bounding surface of the photocatalytic material (see for example, FIG. 13).

In some embodiments, at least a portion of the photocatalytic material is wavy and porous.

Figure 14:
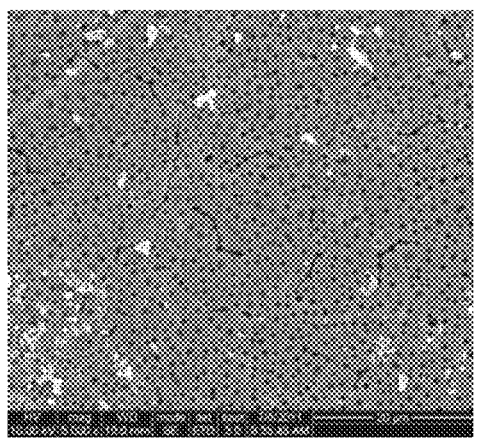
FIG. 14 depicts an SEM image of a porous photocatalyst material (Material C from Example 11).
Figure 15:
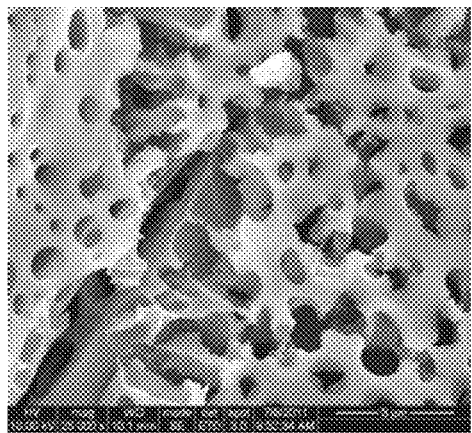
FIG. 15 depicts an SEM image of a porous photocatalyst material (Material C from Example 11).
Figure 16:
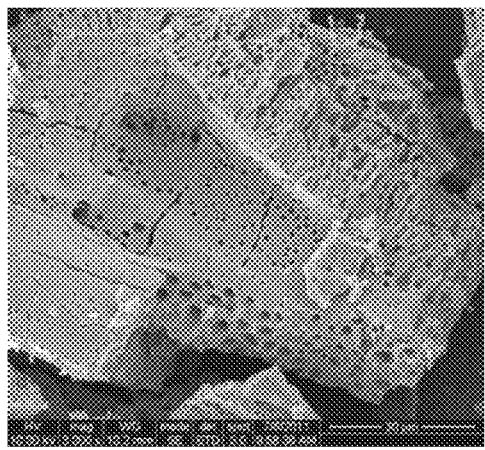
FIG. 16 depicts an SEM image of a porous photocatalyst material (Material C from Example 11).
Figure 17:
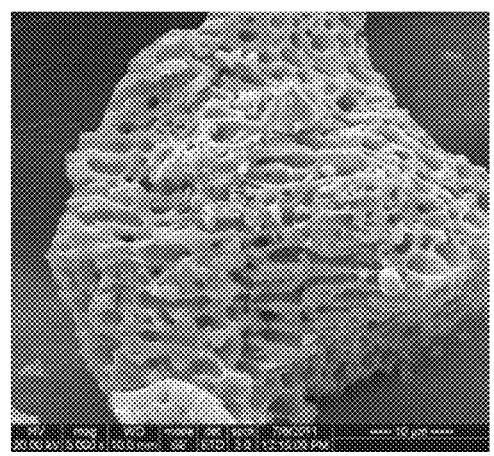
FIG. 17 depicts an SEM image of a porous photocatalyst material (Material C from Example 11).

In some embodiments at least a portion of the photocatalytic material comprises a plurality of pores. In some embodiments, the plurality of pores can be an interconnected porous network in a cluster or aggregation of nanostructures. In some embodiments, the porous network is aperiodic. In some embodiments, the pores defined therein are generally spherical. In some embodiments, at least a portion of the generally spherical pores are interconnected. In some embodiments, the generally spherical pores are between about 5 nm to about 5 μm in diameter. In some embodiments, at least a portion of the pores are generally cylindrical. In some embodiments, at least a portion of the generally cylindrical pores are substantially parallel to one another. In some embodiments, at least a portion of the generally cylindrical pores are interconnected. In some embodiments, the pores are between about 5 nm to about 5 μm in diameter. In some embodiments, at least a portion of the generally cylindrical pores are oriented orthogonal to one of the bounding surfaces. In some embodiments, the porous network is aperiodic. Examples of porous nanostructure can be seen in FIGS. 14-16.

The photocatalytic composition comprises an inorganic compound, such as an inorganic compound having a transition metal; a Group III, IV or V metal; an alkali earth metal or a rare earth metal. The inorganic compound can be a metal oxide, such as an oxide of a transition metal; a Group III, IV or V metal; an alkali earth metal or a rare earth metal. In some embodiments, the photocatalytic composition comprises an oxide of titanium or tin.

A photocatalytic composition can include metal oxide that is substantially undoped or substantially pure, or is doped or loaded. A doped composition includes a doping atom that occupies a matrix position normally occupied by an atom of the pure, undoped, compound. A loaded composition includes a material that is combined with another material, wherein the material loaded into the composition is not necessarily a dopant, or does not necessarily occupy a matrix position normally occupied by atom of the pure, undoped compound.

In some embodiments, a metal oxide may be doped or loaded with carbon, nitrogen, or silver, such as carbon atoms, nitrogen atoms, silver atoms, or compounds or ions thereof.

In some embodiments the photocatalytic composition comprises an oxide of titanium and tin, and is doped or loaded with carbon, nitrogen, and silver.

In some embodiments, the photocatalytic composition comprises about 40% to about 99%, about 60% to about 90%, about 40%, about 50%, about 60%, about 70%, about 80%, about 85%, about 90%, or about 95%, titanium, based upon the total number of metal atoms in the composition.

In some embodiments, the photocatalytic composition comprises about 0% to about 20%, about 10% to about 20%, about 0%, about 5%, about 10%, about 15%, about 20% or about 25% tin, based upon the total number of metal atoms in the composition.

In some embodiments, the photocatalytic composition comprises about 0% to about 20%, about 0% to about 10%, or is substantially free of silver, based upon the total mass of the composition.

In some embodiments, the photocatalytic composition comprises about 0.01% to about 5% carbon, about 0.1% to about 2% carbon, about 0.3% to about 1% carbon, about 0.4% to about 1% carbon, about 0.4% to about 0.6% carbon, about 0.5% carbon, or 0.51% carbon, based upon the total mass of the composition. In some embodiments, the number of carbon atoms in the photocatalyst is about 2% to about 10%, about 3% to about 8%, about 4% to about 5%, about 4.7%, or 4.65% of the total number of atoms in the composition. In some embodiments, the photocatalytic composition comprises about 0.001% to about 5% nitrogen, about 0.05% to about 0.5% nitrogen, about 0.1% to about 0.4% nitrogen, about 0.1% to about 0.3% nitrogen, about 0.2% nitrogen, or 0.235% nitrogen, based upon the total mass of the composition. In some embodiments, the number of nitrogen atoms in the photocatalyst is about 2% to about 5%, about 3% to about 4%, about 3%, or 3.29% of the total number of atoms in the composition.

In some embodiments the photocatalytic composition comprises a photocatalytic inorganic compound having a transition metal; a Group III, IV or V metal; an alkali earth metal or a rare earth metal. In some embodiments, the transition metals may be Ti, W, Fe, Ni, Cu, Nb V, Zn, or Zr.

In some embodiments, the photocatalytic inorganic compound comprises titanium. In some embodiments, the photocatalytic inorganic compound comprises tungsten. In some embodiments, the Group III metal can be B or In. In some embodiments, the Group IV metal can be Sn. In some embodiments, the Group V element can be Bi. In some embodiments, the alkali earth metal can be Sr. In some embodiments, the rare earth metal can be Ce.

In some embodiments, the photocatalytic inorganic compound comprises $Ti_{1-a}M_a(O_{1-x-y}C_xN_y)_2$ where M is at least one naturally occurring element, and $0 \leq a < 1$, $x < 1.0$, $y < 1$, and $0 \leq x+y < 1$, In some embodiments, the photocatalytic inorganic compound comprises $Ti_{1-a}Sn_a(O_{1-x-y}C_xN_y)_2$ where $0 \leq a < 1$, $x < 1.0$, $y < 1$, and $0 \leq x+y < 1$. In some embodiments, the photocatalytic inorganic compound comprises $Ti_{0.85}Sn_{0.15}(O_{1-x-y}C_xN_y)_2$ where $x < 1.0$, $y < 1$, and $0 \leq x+y < 1$. Other appropriately designed doping of specific semiconductors can result in visible-light activated (activated by light of wavelengths 380-800 nm) photocatalysts, e.g., for indoor applications, where UV light may not be available. Such suitable photocatalytic compositions are described pending patent application Ser. No. 13/741,191, filed Jan. 14, 2013, which is incorporated by reference herein in its entirety.

While there may be many ways to prepare a photocatalytic material comprising nanostructures, these materials may be prepared by heating a liquid dispersion comprising a photocatalyst precursor, a reducing agent, and an oxidizing agent (referred to herein as "the liquid dispersion") so that the dispersion undergoes combustion to form a solid product. For example, the dispersion may be heated at a temperature sufficient to initiate combustion, and heating can continue until a solid product is formed.

The term dispersion includes, but is not limited to, solutions, suspensions, sols, emulsions, and/or slurries. The liquid dispersion can further comprises adding at least one dopant precursor.

A photocatalyst precursor can contain any inorganic or organometallic compound that can be converted to an inorganic photocatalyst by process that includes combustion. Some photocatalyst precursors comprise a compound containing a transition metal; a Group III, IV or V metal; an alkali earth metal or a rare earth metal. In some embodiments, the transition metals may be Ti, W, Fe, Ni, Cu, Nb V, Zn, or Zr. In general organic acid salts of a metal to be Incorporated into the photocatalyst can be used as photocatalyst precursors. For example acetate, lactate, citrate, maleate, or octoate salts of one of the metals above can be used as photocatalyst precursors. In general inorganic salts including nitrates, sulfates, carbonates, chlorides, bromides, iodides, fluorides, silicates, aluminates, borates or ammonium salts can be used as photocatalyst precursors.

In some embodiments a photocatalyst precursor includes a titanium compound. The type of titanium compound used as a photocatalyst precursor is not particularly limited. For example, an organotitanium compound may be used. Further, the type of organotitanium compound used in the process is not particularly limited. In some embodiments, the organotitanium compound can be water-soluble. The titanium compound can be, for example, metal nitrates, metal ammonium salts, or organic metal-containing compounds. In some embodiments, the organotitanium compound is an ester or a chelate. In some embodiments, the organotitanium compound is an organic titanate. Non-limiting examples of organotitanium compounds that may used include TYZOR (Dorf Ketal) having the structure of Formula (I)

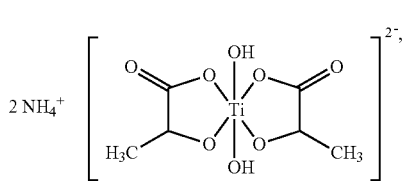

organic titanates like titanium(IV) bis(ammonium lactate) dihydroxide, ammonium oxo-oxalatotitanate (IV), hydroxycarboxylato-peroxotitanium, titanium lactate, titanium maleate complexes, titanium oxalate, and titanium citrate. These organotitanium compounds may be used alone or in combination. In some embodiments, the organotitanium compound is represented by Formula I:

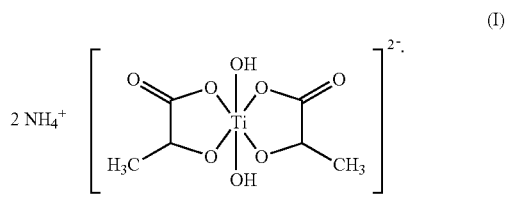

In some embodiments a photocatalyst precursor includes a tin compound, such as stannous octoate.

A liquid dispersion can also contain a dopant precursor. The type of dopant compound is also not particularly limited so long as it includes a metal element other than a metal of the photocatalyst precursor. In some embodiments, the compound is an organometallic compound. In some embodiments, the organometallic compound is water-soluble. The organometallic compound may, for example, include a metal element such as Sn, Ni, Sr, Ba, Fe, Bi, V, Mo, W, Zn, Cu, or a combination thereof. In some embodiments, the dopant precursor contains Sn. Non-limiting examples of metal compounds that can be used as dopant precursors include nitrates, chlorides, sulfates, metal ammonium complexes like ammonium metavanadate, citrates, acetates, acetylacetonates, octoates, and hexanoates of the metal to be used as a dopant. Non-limiting examples of organometallic compounds include stannous octoate, tin(IV)-oxine complexes, dibutyl tin, tetrabutyl tin, metallocenes including ferrocene and nickelocene, ferrates, vanadates, molybdates, zincates, and cuprates. The choice of a particular compound is typically influenced by the metal contained in the compound rather than the nature of the compound itself. These compounds may be used alone or in combination. In some embodiments, titanium and one or more of the dopants are contained in the same precursor. In the case of C and N dopants, the reducing agent and oxidizing agent can be the dopant precursor.

Any suitable solvent may be used as a medium for the liquid dispersion. Examples can include water, methanol, ethanol, propanol, etc.

In some embodiments, the photocatalyst and/or dopant precursor can be Tyzor LA, ammonium metatungstate, tin octoate, ammonium oxo-oxalatotitanate (IV), hydroxycarboxylato-peroxotitanium, titanium lactate, titanium maleate complexes, titanium citrate, or a combination thereof. In some embodiments the photocatalyst and/or dopant precursor can include TyzorLA and/or ammonium metatungstate. In some embodiments, the TyzorA/ammonium metatungstate can be a 3:1 molar ratio of TyzorA:ammonium metatungstate.

In some embodiments, the photocatalyst and/or dopant precursor can be 4 moles of at least one precursor dissolved in a polar solvent, e.g., water. In some embodiments, the precursor can be a 3:1 molar ratio of Tyzor:Dopant metal precursor. In some embodiments, the metal dopant compound can be ammonium metatungstate. In some embodiments, the metal dopant compound can be stannous octoate.

An oxidizing agent can include any material that can oxidize a reducing agent in a combustion reaction. For example, a nitrate compound such as a metal nitrate, ammonium nitrate, or guanidine nitrate. In some embodiments, the oxidizing agent is hydrogen peroxide. In some embodiments, the oxidizing agent is ammonium nitrate. In some embodiments, the oxidizing agent is silver nitrate.

A reducing agent can include any material that can reduce an oxidizing agent in a combustion reaction. Some typical reducing agents include amino acids, urea, citrates, and hydrazine-based compounds. Some useful amino acids include glycine, alanine, valine, leucine, serine, etc. Some useful hydrazine-based compounds include carbohydrazide; trioxane, 3-methylpyrozole-5-one, diformyl hydrazine, and hexamethylenetetramine. In some embodiments, the reducing agent is glycine.

The combustion reaction may be more complete if the equivalent ratio of oxidizing agent to reducing agent is about 1:1. In some embodiments, the reducing agent/oxidizing agent can be a 3:1 molar ratio of reducing agent:oxidizing agent. In some embodiments, the reducing agent:oxidizing agent can be a 3:1 molar ratio of glycine:ammonium nitrate.

The relative amounts of oxidizing agent/reducing agent to photocatalyst precursor can affect the porosity of a nanostructure. For example, a low oxidizing agent/reducing agent content can result in a nanostructure with a low pore content, or a nanostructure that is substantially free of pores. In some embodiments, the molar ratio of oxidizing agent/reducing agent:photocatalyst precursor is about 5:1 to about 1:5, about 3:1 to about 1:3, about 2:1 to about 1:2, about 5:3 to about 3:5, about 5:4 to about 4:5, about 1:1 about 1:3, or about 1:9.

In some embodiments, the ratio of precursor to reducing agent-oxidizing agent is between about 1:1 (equal amounts of precursor to reducing agent-oxidizing agent) to about 1 part precursor to about 2.5 parts reducing agent-oxidizing agent. In some embodiments, materials made from such precursor ratios result in a portion of the material characterized by a morphology of at least one of nanoflake-shaped, nanosheet-shaped, pseudoplanar-shaped or ribbon-shaped (FIGS. 8 and 9).

In some embodiments, the ratio of precursor to reducing agent-oxidizing agent is between about 1 part precursor to about 2.5 parts reducing agent-oxidizing agent to about 1 part precursor to about 7.5 parts reducing agent-oxidizing agent. In some embodiments, materials made from such precursor ratios result in a portion of the material characterized by a morphology of at least one of nanoflake-shaped, nanosheet-shaped, pseudoplanar-shaped or ribbon-shaped and define a plurality of pores therein (FIGS. 12-13).

Figure 12:
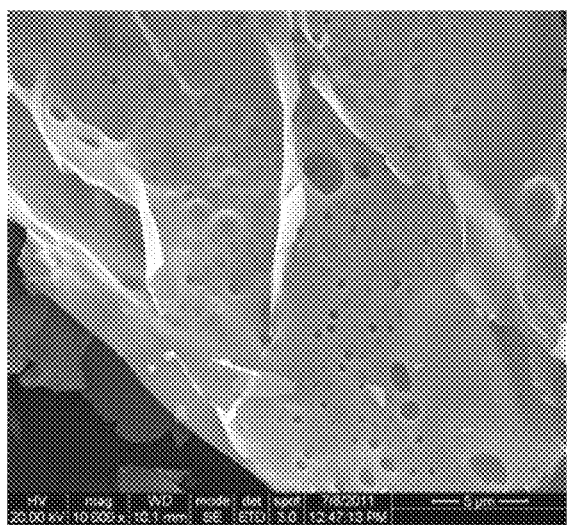
FIG. 12 depicts an SEM image of a porous photocatalyst nanosheet-shaped and/or nanoflake-shaped material (Material B from Example 11).
Figure 13:
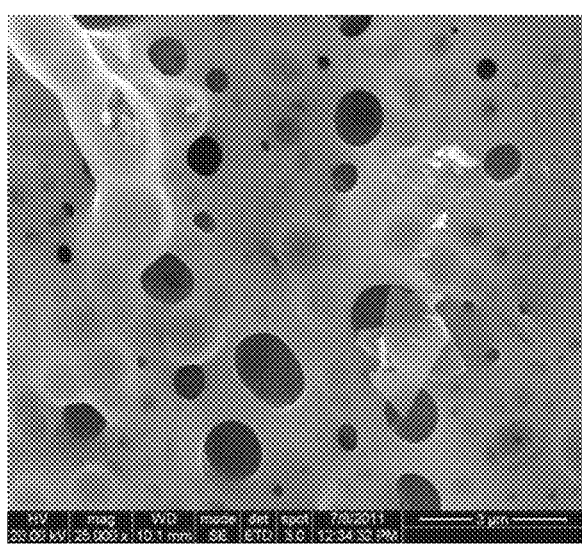
FIG. 13 depicts an SEM image of a porous photocatalyst nanosheet-shaped and/or nanoflake-shaped material (Material B from Example 11).

It is believed that materials produced using a 3:1 mixture (Material B from FIG. 18) reducing agent-oxidizing agent and precursor may have a combination of evolving bubbles of gas and flakes as observed in FIGS. 12 and 13. It may also suggest that flakes may evolve as reaction gases (such as $CO_2$, $N_2$ and $H_2O$) push solid material outward, and thus "peeling" away a layer.

In some embodiments, the ratio of precursors to reducing agent-oxidizing agent is greater than one part precursor to about 7.5 parts reducing agent-oxidizing agent. In some embodiments, materials made from such precursor ratios result material having a high pore content (FIGS. 14-17). It is believed that when the gas evolution is faster than the solidification of layers, gas bubbles, and in some cases pores, are generated. Materials produced using a 9:1 mixture (sample C from FIG. 17) reducing agent:oxidizing agent to precursor showed microporous morphology with channels running parallel to the direction of gas evolution (Swiss cheese morphology) with almost no nanoflake, etc, shaped material as seen in FIGS. 14-17. This is believed to be a result of rapid and voluminous gas evolution.

The liquid dispersion may be heated by a conductive, convective, radiative or a self-generated heating mechanism. In some embodiments, the liquid dispersion is heated using a heated plate, a heated platform, an induction heater, a microwave generator, a resistive heater, an optical concentrator, sonic heater, a heat bath, a box furnace, a muffle furnace, a tube furnace, a flame gun or torch, by spray pyrolysis, by flame pyrolysis, laser pyrolysis, and/or thermal plasma. In some embodiments, the thermal plasma is direct current plasma or radio frequency inductively-coupled plasma. In some embodiments, the liquid dispersion is heated from the energy produced by an exothermic reaction.

The liquid dispersion may be heated at any temperature that is sufficiently high for combustion to occur. In some embodiments, the liquid dispersion may be heated to: about 50° C. to about 1000° C., about 200° C. to about 800° C., about 100° C. to about 500° C., about 300° C. to about 500° C., about 300° C. to about 400° C., about 330° C. to about 380° C., or about 350° C.

The liquid dispersion may be heated at a combustion temperature for any amount of time that allows a solid product to be formed. In some instances, the liquid dispersion can be heated until the mixture no longer evolves gas, or until a powdered material is formed. For example, heating may occur for at least about 1 min, at least about 5 min, at least about 10 min, about 1 s to about 60 min, about 10 s to about 30 min about 1 min to about 120 min, about 5 min to about 60 min, about 5 min to about 20 min, about 10 min to about 30 min, or about 20 min.

A solid obtained as a product of heating the liquid dispersion (referred to as "the solid product") can be annealed to reduce the color of the solid, to further remove volatile elements or compounds from the solid, or to adjust the level of doping or loading in the composition. Annealing can occur at a temperature that is lower than, higher than, or the same as the temperature at which combustion was carried out.

In some embodiments, annealing is done at a sufficient temperature to remove carbonaceous residue without substantially degrading dopant levels within the material. The term carbonaceous material refers to extraneous material exterior to the photocatalyst crystal, e.g., outside the crystal lattice of the photocatalyst. For example, if the dopants used are N and C, 400° C. can be sufficient for such purpose, while at 550° C. dopant levels may be reduced so that they are insufficient for high photocatalytic activity, especially visible-light activated photocatalytic activity. In some embodiments, the temperature at which the solid product is annealed can be selected to achieve a desired level of dopants.

In some methods, the solid product is annealed at a first annealing temperature that is higher than a temperature at which heating of the liquid dispersion occurred. In some embodiments, the first annealing temperature is at least about 20° C., about 20° C. to about 400° C., or about 40° C. to about 200° C., higher than the temperature at which heating of the liquid dispersion occurs. In some embodiments, the first annealing temperature is about 250° C. to about 800° C., about 300° C. to about 500° C., about 350° C. to about 500° C., about 350° C., or about 475° C.

Annealing may continue for as long as necessary to obtain the desired color or other property. For example, annealing may include heating the solid product for about 1 min to about 24 h, about 30 min to about 5 h, about 1 h to about 2 h, or about 1 h.

Annealing may be a two-step process, wherein the solid product is first annealed at a first annealing temperature that is higher than the temperature at which heating of the liquid dispersion occurs, and is then annealed at a second annealing temperature that is higher than the first annealing temperature. This two-step process may be helpful to reduce annealing temperature, which can in turn help to increase the carbon and nitrogen content of the photocatalyst obtained as a final product.

In some embodiments, where a two-step annealing process is used, the first annealing temperature is at least about 20° C., about 20° C. to about 200° C., about 20° C. to about 70° C., or about 50° C., higher than the temperature at which heating of the liquid dispersion occurred.

In some embodiments having a two-step annealing process, the first annealing temperature is about 250° C. to about 600° C., about 300° C. to about 400° C., about 320° C. to about 370° C., or about 350° C.

Annealing may also comprise more than more than 2 steps of different temperatures and times.

The second annealing temperature may be any suitable temperature that is higher than the first annealing temperature, such as about 20° C. higher, about 20° C. to about 500° C., about 20° C. to about 400° C., about 20° C. to about 300° C., about 20° C. to about 100° C., about 20° C. to about 80° C., about 40° C. to about 60° C., about 50° C., about 250° C., about 300° C., or about 350° C. higher than the first annealing temperature. In some embodiments, the second annealing temperature is about 400° C. to about 800° C., about 400° C. to about 700° C., about 400° C. to about 650° C., about 400° C., about 500° C., about 550° C., about 600° C., or about 650° C.

The second annealing step can be shorter than the first annealing step. For example, heating at the second annealing temperature may occur for about 1 min to about 12 h, about 10 min to about 2 h, about 20 min to about 1 h, or about 30 min.

The photocatalytic material can be used as a disinfectant, an odor eliminator, a pollutant eliminator, a self-cleaner, an antimicrobial agent and the like. The materials, compositions, and dispersions can be used to interact with air, liquid, microbial and/or solid substances. In one embodiment, they can be used to clean air such as in confined environments such as in aircraft fuselages or in more contaminated environments such as auto garages. In other embodiments, they can be used for antimicrobial properties such as to coat surfaces in need of disinfection such as food service or production facilities or hospitals or clinics.

In some embodiments, methods are utilized wherein polluted air is exposed to light and a photocatalytic material thereby removing pollutants from the air.

In some embodiments, light and a photocatalytic material can remove about 50%, about 60%, about 70%, about 80%, about 90%, about 95% or more of the pollution in the air.

In another embodiment, methods are utilized wherein polluted water is exposed to light and a photocatalytic material thereby reducing the amount of contaminant in the water.

In some embodiments, light and a photocatalytic material can remove about 50%, about 60%, about 70%, about 80%, about 90%, about 95% or more of the pollution from the water.

In other embodiments, methods are utilized wherein biological contaminants are exposed to light and a photocatalytic material thereby disinfecting the biological material. In some embodiments, biological materials can include food products.

In some embodiments, light and a photocatalytic material can remove about 50%, about 60%, about 70%, about 80%, about 90%, about 95% or more of the contamination from the biological material in the air.

The following embodiments are specifically contemplated.

Embodiment 1

A photocatalytic material comprising: a nanostructure comprising: a thin structure of a photocatalytic composition comprising an inorganic compound, which is defined by a first surface and a second surface on opposite sides of the thin structure of the photocatalytic composition; and wherein the thin structure of the photocatalytic composition has a thickness that is substantially smaller than the square root of the area of the first surface.

Embodiment 2

The photocatalytic material of embodiment 1, wherein the nanostructure is a nanosheet-shaped, nanoflake-shaped, pseudoplanar-shaped, or ribbon-shaped.

Embodiment 3

The photocatalytic material of any preceding embodiment, wherein at least a portion of the nanostructure is wavy.

Embodiment 4

The photocatalytic material of any preceding embodiment, wherein the nanostructure comprises a pore that extends from the first surface to the second surface through the thin structure of the photocatalytic composition.

Embodiment 5

The photocatalytic material of any of embodiments 1-3, wherein the nanostructure is free of pores that extend from the first surface to the second surface through the thin structure of the photocatalytic composition.

Embodiment 6

The photocatalytic material of any preceding embodiment, having a Brunauer-Emmett-Teller (BET) specific surface area of at least 30 $m^2/g$.

Embodiment 7

The photocatalytic material of any preceding embodiment, wherein the thickness of the thin structure of the photocatalytic composition is about 10 nm to about 200 nm.

Embodiment 8

The photocatalytic material of any preceding embodiment, wherein the thickness of the thin structure of the photocatalytic composition is about 20 nm to about 25 nm.

Embodiment 9

The photocatalytic material of any preceding embodiment, wherein the square root of the area of the first surface is at least 10 times the thickness of the thin structure of the photocatalytic composition.

Embodiment 10

The photocatalytic material of any preceding embodiment, wherein the inorganic compound is a metal oxide.

Embodiment 11

The photocatalytic material of any preceding embodiment, wherein the photocatalytic composition is doped or loaded with carbon, nitrogen, or silver.

Embodiment 12

The photocatalytic material of any preceding embodiment, wherein the photocatalytic composition comprises an oxide of titanium and tin, and is doped or loaded with carbon, nitrogen, and silver.

Embodiment 13

The photocatalytic of any preceding embodiment, wherein the photocatalytic composition comprises about 40% to about 99% titanium, based upon the molar ratio of the composition.

Embodiment 14

The photocatalytic of any preceding embodiment, wherein the photocatalytic composition comprises about 0% to about 20% tin, based upon the molar ratio of the composition.

Embodiment 15

The photocatalytic of any preceding embodiment, wherein the photocatalytic composition comprises about 0% to about 20% silver, based upon the molar ratio of the composition.

Embodiment 16

The photocatalytic of any preceding embodiment, wherein the photocatalytic composition comprises about 2% to about 10% carbon, based upon the molar ratio of the composition.

Embodiment 17

The photocatalytic of any preceding embodiment, wherein the photocatalytic composition comprises about 2% to about 5% nitrogen, based upon the molar ratio of the composition.

Embodiment 18

A method of manufacturing a high surface area photocatalyst, comprising: heating a liquid dispersion comprising a photocatalyst precursor, a reducing agent, and an oxidizing agent at a temperature sufficient to initiate combustion, wherein heating continues for a time sufficient to form a solid product.

Embodiment 19

A method of manufacturing a photocatalyst according to embodiment 1, comprising: heating a liquid dispersion comprising a photocatalyst precursor, a reducing agent, and an oxidizing agent at a temperature sufficient to initiate combustion, wherein heating continues for a time sufficient to form a solid product.

Embodiment 20

The method of embodiment 18 or 19, wherein the molar ratio of oxidizing agent to reducing agent is about 5:1 to about 1:5.

Embodiment 21

The method of any of embodiments 18-20, wherein the solid product is annealed at a first annealing temperature that is higher than the temperature at which heating of the liquid dispersion occurs.

Embodiment 22

The method of any of embodiments 18-21, wherein the solid product is the first annealed at a first annealing temperature that is higher than the temperature at which heating of the liquid dispersion occurs, and is then annealed at a second annealing temperature that is higher than the first annealing temperature.

Embodiment 23

The method of any of embodiments 18-22, wherein the first annealing temperature is at least 20° C. higher than the temperature at which heating of the liquid dispersion occurs.

Embodiment 24

The method of embodiment 23, wherein the second annealing temperature is at least 20° C. higher than the first annealing temperature.

EXAMPLES

Example 1

Solution A was prepared by adding stannous octoate (Spectrum Chemicals, 2.52 g) to titanium(IV) bis(ammonium lactate) dihydroxide, a Ti precursor solution (Sigma Aldrich, 20 mL of 50 wt. % in water). The resulting solution was heated at about 100° C. for about 20 min. To this resultant solution, ammonium nitrate, an oxidizing agent, (Sigma Aldrich, 10 g) and glycine, a reducing agent, (Sigma Aldrich, 4 g) were added. Solution B was prepared by dissolving $AgNO_3$, an oxidizing agent, (Alfa Aesar, 0.207 g) in a minimum quantity of water, and then solution B was added to the solution A. This resultant solution was heated (Barnstead Thermolyne 47900, box furnace) at about 350° C. until no further gases were generated, e.g., for about 20 min, to form a dark grey to black voluminous foamy powder. The resultant powder was then transferred into a large glass petri dish (100×50) without crushing, annealed at about 475° C. for about 1 h, and then cooled to room temperature to get light-colored powder.

Examples 2 to 9

Examples 2 to 9 were made in a manner similar to Example 1 above, except that amounts of different reducing agents and titanium precursor were used as indicated in Table 1 below. Comparative Example 1 was made in a manner similar to Example 1 above, except that 20 mL of Ti precursor were used and no reducing agent was added to Solution B.

TABLE 1

| Example | Reducing Agent | Reducing Agent Amount |
|---|---|---|
| 2 (Ti precursor = 20 mL) | Valine | 6.24 g |
| 3 (Ti precursor = 20 mL) | Leucine | 6.99 g |
| 4 (Ti precursor = 20 mL) | Carbohydrazide | 4.79 |
| 5 (Ti precursor = 20 mL) | Hexamethylenetetramine | 7.46 g |
| 6 (Ti precursor = 7 mL) | Urea | 1.12 g |
| 7 (Ti precursor = 7 mL) | Proline | 2.15 g |
| 8 (Ti precursor = 20 mL) | Alanine | 4.75 g |
| 9 (Ti precurosr = 7 mL) | Serine | 5.6 g |
| Comparative example 1 (Ti Precursor = 20 mL) | — | — |

Example 10

Figure 7:
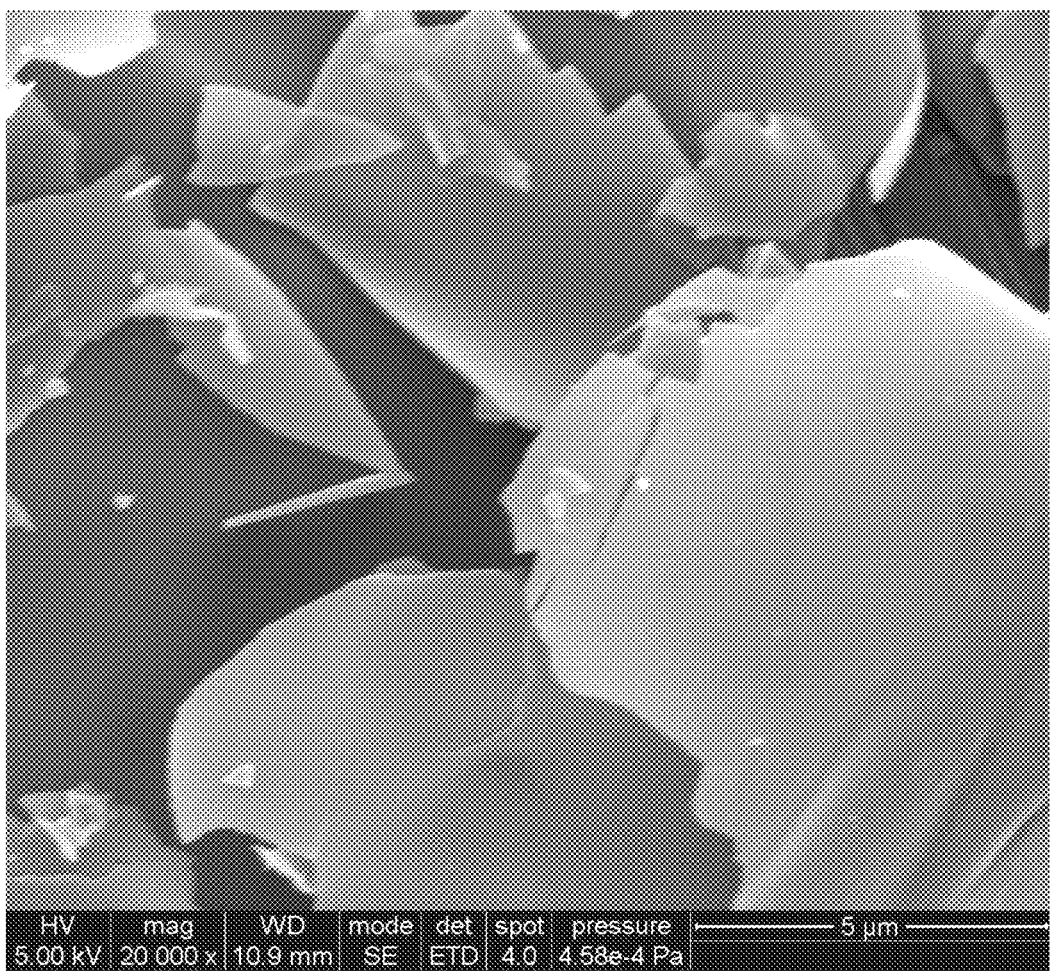
FIG. 7 depicts a scanning electron microscope (SEM) image of the photocatalyst material of Example 10.

Example 10 was made in a manner similar to example 1 above, except that the Solution A and B mixture was heated at about 300° C. for about 2 h and then annealed at about 350° C. for about 1 h, followed at about 400° C. for about 30 min to produce a light-colored powder. An SEM of the resulting material is shown in FIG. 7. BET surface area of the precursor particles was measured by a BET surface area analyzer (Gemini V, Micromeritics Instrument Corporation, Norcross Ga.) to be about 198 m²/g.

Examples 11-16

Examples 11-16 were made in a manner similar to Example 10 above, except that (a) no stannous octate was incorporated in Solution A; (b) 10 ml of Ti Precursor were used instead of 20 ml; (c) 4.0 or 7.5 g of Glycine were used as a reducing agent; (d) 5 g of $NH_4NO_3$ was used instead of 10 g as an oxidizing agent; (e) smoldering combustion temperature was 300° C. for about 30 min; and (f) followed by 30 min at a different second annealing temperatures as shown in Table 2.

TABLE 2

| Example | Reducing Agent | Amount | Second Annealing Temp |
|---|---|---|---|
| Example 11 | Glycine | 7.5 g | 550° C. |
| Example 12 | Glycine | 7.5 g | 600° C. |
| Example 13 | Glycine | 7.5 g | 650° C. |
| Example 14 | Glycine | 4.0 g | 550° C. |
| Example 15 | Glycine | 4.0 g | 600° C. |
| Example 16 | Glycine | 4.0 g | 650° C. |

The resulting material all had BET values of between 0.1-3.3 m²/g or about 3 m²/g and exhibited substantially similar morphology to that seen in FIG. 7.

Comparative Example 2

Comparative example 2 was made in a manner similar to Example 10 above, except that no reducing agent was incorporated in Solution B.

Analysis

Carbon and nitrogen content were determined for the materials prepared as described above using Leco Corp, (St. Joseph, Mich., USA), CS600 and TC600, respectively, using standard operating procedures provided by Leco. Powder XRD patterns were obtained using Cu K-alpha radiation (Rigaku Miniflex II, Rigaku Americas, Woodland, Tex., USA). Diffuse reflectance spectra (DRS) were obtained using a Multi Channel Photo Detector 7000 (Otsuka Electronics) and SEM morphologies were obtained using an FEI Inspect F SEM.

Photocatalyst Properties for Methylene Blue Degradation

The photocatalytic properties of photocatalysts were compared by measuring the degradation of methylene blue. Each sample (150 mg) was placed in 35 ml of an aqueous solution of methylene blue (0.7-1.0 absorption) for about 2 h in the dark and then exposed to a blue light-emitting diode array (455 nm, 3.5 mW/cm²) for about 5 h. The degradation of methylene blue was measured about every h by monitoring its concentration using UV-Vis absorption spectroscopy (Cary-50, Spectrophotometer Agilent Technologies, Santa Clara, Calif., USA). The concentration was calculated as the area under the UV-Vis absorption spectrum between 400 and 800 nm. Table 3 summarizes the percentage of MB degradation along with BET values, wt. % of C and N and SEM morphology.

TABLE 3

| Example | Reducing Agent | MB Degradation | BET, m²/g | Wt. % C (Atomic % C) | Wt. % N (Atomic % N) | SEM Morphology |
|---|---|---|---|---|---|---|
| 2 | Valine | 22.19% | 114 | 0.150 (1.36) | 0.118 (0.919) | Porous |
| 3 | Leucine | 38.55% | 130 | 0.151 (1.37) | 0.066 (0.51) | Porous |
| 10 | Glycine | 78.7% | 191 | 0.513 (4.65) | 0.235 (1.83) | Thin Plates |
| Comparative 1 | — | 62.1% | 29 | 0.820 (7.16) | 0.425 (3.29) | Particles |
| Comparative 2 | No Reducing agent | 33.86% | 32 | 0.974 (8.81) | 0.334 (2.59) | Particles |
| 1 | Glycine | 61.2 | 122 | 0.12 (1.09) | 0.065 (0.506) | Thin plates |

Figure 11:
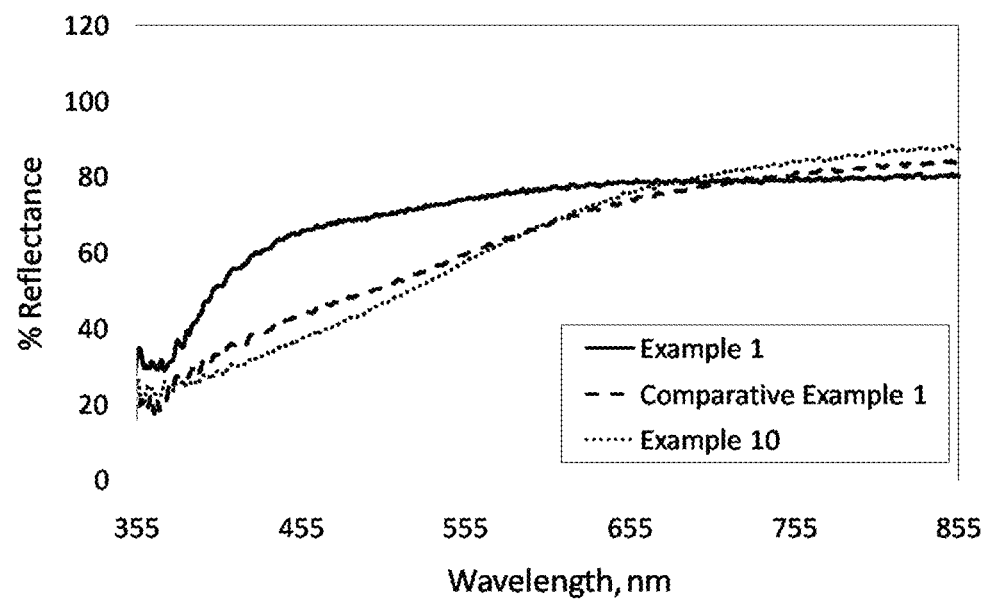
FIG. 11 depicts a DRS comparison of Examples 1, 10 and comparative example 1.

Table 2 above and the DRS of Example 1, Comparative Example 1, and Example 10 (FIG. 11) shows that appropriate choice of annealing temperatures can help to retain the C and N dopant levels while producing a high surface area material. From FIG. 11, Example 10 (with different annealing temperatures and times from Example 1) shows a large light absorption in the visible regime (greater than 380 nm) while Example 1 has less visible absorption. Example 10 contains more C and N dopants than Example 1 and demonstrates higher methylene blue degradation than Example 1 when exposed to visible light from the blue light-emitting device referred to above.

Example 11

Figure 18:
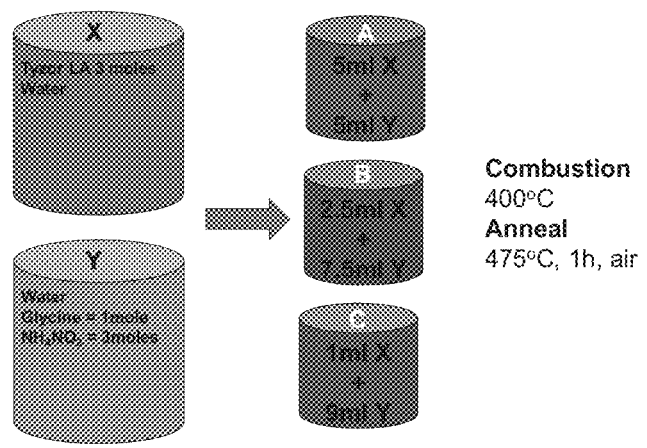
FIG. 18 is a schematic of the experiment of Example 11.

A simplified schematic of Example 11 is depicted in FIG. 18.

Stock Solution X

Stock Solution X (3M Tyzor LA in water) was prepared by mixing titanium(IV) bis(ammonium lactate) dihydroxide, Ti precursor (Sigma Aldrich), with water.

Stock Solution Y

Stock Solution Y (1M glycine and 3M ammonium nitrate ($NH_4NO_3$)) was prepared by dissolving oxidizing agent ammonium nitrate (Sigma Aldrich) and glycine (Sigma Aldrich) in water, and stirring at room temperature (RT) to full dissolution.

Material A

Stock solution X (5 mL) was added to 5 mL of Stock solution Y and the resultant solution was heated (Barnstead Thermolyne 47900, box furnace) at 400° C. for about 20 min to form a substantially a voluminous material. After no further gas evolution were perceived, the resultant material was transferred into a large glass petri dish without crushing, annealed at about 475° C. for about 1 h, and then cooled to room temperature to obtain a light-colored powder.

Materials B and C

Materials B and C were made in a similar manner to Material A, except that 2.5 mL of Stock Solution X was added to 7.5 mL of Stock Solution Y for Material B and 1.0 mL of Stock Solution X was added to 9.0 mL of Stock Solution Y for Material C.

Analysis

Figure 19:
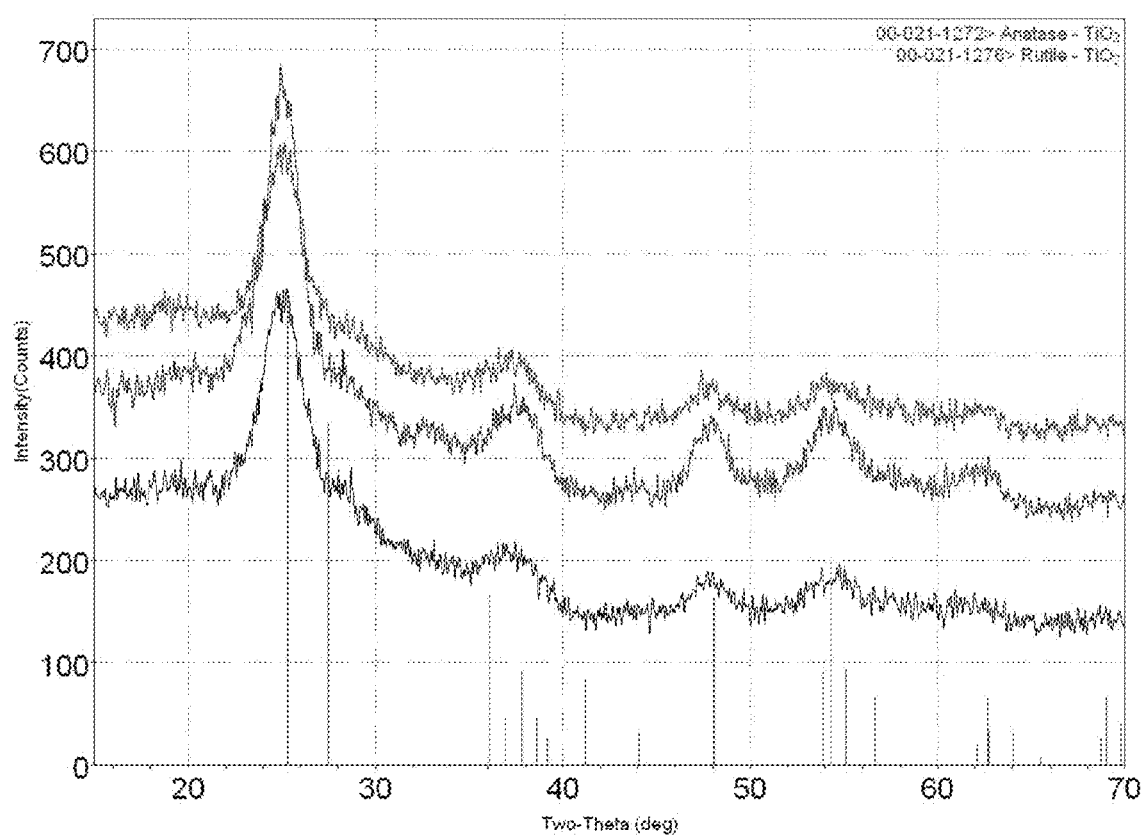
FIG. 19 is an XRD of Materials A, B, and C from Example 11.

Materials A, B and C were subjected to XRD analysis and SEM examination. The BET values of these materials were in the 111-116 $m^2/g$ range. The respective SEM images are depicted in FIGS. 8-9 (Material A), FIGS. 12-13 (Material B) and FIGS. 14-17 (Material C). The material produced from 1:1 (Material A) volume ratio of oxy/reducing agent to precursor showed thin flake-shaped, nanoflake-shaped and/or nanosheet-shaped material morphology (FIGS. 8 and 9). The nanflakes were about 23-25 nm thick (FIG. 9). Material produced using a 3:1 (Material B) molar ratio of oxy/reducing agent to precursor showed a combination of evolving bubbles and flakes as observed in FIGS. 12 and 13. Evolving bubbles may result in through and/or blind pores. Materials produced using a 9:1 (Material C) molar ratio of oxy/reducing agent to precursor showed microporous morphology with channels running parallel to the direction of gas evolution (Swiss cheese morphology) with almost no flakes, as seen in FIGS. 14-17. The x-ray diffraction (XRD) analysis is shown in FIG. 18. XRD, FIG. 19, shows that all three material samples produced using this scheme result in anatase phase materials with small crystallites (wide XRD peaks).

Example 12

Reducing Odor on an Airliner

A dispersion including a photocatalytic material is provided as a coating on a thin adhesive film. This adhesive film is used to coat the ceiling of a Boeing 737. The photocatalyst composition can react with ambient light from light emitting diode light fixtures above the overhead bins to generate reactive airborne species that can reduce odor in the air.

Example 13

Disinfecting Food Preparation Surfaces

A photocatalytic material capable of being applied as a spray is provided to a food preparation factory to coat its work surfaces. The resin can be applied in a heated or unheated state in order to properly bond with a work surface. All surfaces that are to come into contact with food in the factory are sprayed with the resin.

The factory is equipped with organic light emitting diode light fixtures for general lighting. This ambient light can react with the resin surface thereby creating oxygen radicals on the surface. These radicals can react with food contaminants thereby rendering the food safe. As a result of applying the resin to the work surfaces, instances of bacteria spreading into the food supply are reduced 50%.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

The terms "a," "an," "the" and similar referents used in the context of describing the invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of any claim. No language in the specification should be construed as indicating any non-claimed element essential to the practice of the invention.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

In closing, it is to be understood that the embodiments disclosed herein are illustrative of the principles of the claims. Other modifications that may be employed are within the scope of the claims. Thus, by way of example, but not of limitation, alternative embodiments may be utilized in accordance with the teachings herein. Accordingly, the claims are not limited to embodiments precisely as shown.

We claim:

1. A photocatalytic material comprising:
   a nanostructure comprising: a thin structure of a photocatalytic composition comprising titanium, tin, carbon, nitrogen, and oxygen, which is defined by a first surface and a second surface on opposite sides of the thin structure of the photocatalytic composition; and
   wherein the square root of the area of the first surface is at least 3 times the thickness of the thin structure of the photocatalytic composition.

2. The photocatalytic material of claim 1, wherein the nanostructure is a nanosheet-shaped, nanoflake-shaped, pseudoplanar-shaped, or ribbon-shaped.

3. The photocatalytic material of claim 1, wherein at least a portion of the nanostructure is wavy.

4. The photocatalytic material of claim 1, wherein the nanostructure comprises a pore that extends from the first surface to the second surface through the thin structure of the photocatalytic composition.

5. The photocatalytic material of claim 1, wherein the nanostructure is free of pores that extend from the first surface to the second surface through the thin structure of the photocatalytic composition.

6. The photocatalytic material of claim 1, having a Brunauer-Emmett-Teller (BET) specific surface area of at least 30 $m^2/g$.

7. The photocatalytic material of claim 1, wherein the thickness of the thin structure of the photocatalytic composition is about 10 nm to about 200 nm.

8. The photocatalytic material of claim 1, wherein the square root of the area of the first surface is at least 10 times the thickness of the thin structure of the photocatalytic composition.

9. The photocatalytic material of claim 1, wherein the photocatalytic composition is doped or loaded with carbon, nitrogen, or silver.

10. The photocatalytic material of claim 1, wherein photocatalytic composition comprises an oxide of titanium and tin, and is doped or loaded with carbon, nitrogen, and silver.

11. The photocatalytic material of claim 1, wherein the photocatalytic composition comprises about 40% to about 99% titanium, based upon the total number of metal atoms in the composition.

12. The photocatalytic material of claim 1, wherein the photocatalytic composition comprises about 0% to about 20% tin, based upon the total number of metal atoms in the composition.

13. The photocatalytic material of claim 1, wherein the photocatalytic composition comprises about 0% to about 20% silver, based upon the total mass the composition.

14. The photocatalytic material of claim 1, wherein the photocatalytic composition comprises about 2% to about 10% carbon, based upon the total mass the composition.

15. The photocatalytic material of claim 1, wherein the photocatalytic composition comprises about 2% to about 5% nitrogen, based upon the total mass the composition.

* * * * *